(12) United States Patent
Sun

(10) Patent No.: US 7,436,751 B2
(45) Date of Patent: *Oct. 14, 2008

(54) OPTICAL PICKUP HEAD AND INFORMATION RECORDING AND/OR REPRODUCING DEVICE INCORPORATING SAME

(75) Inventor: Wen-Hsin Sun, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 525 days.

This patent is subject to a terminal disclaimer.

(21) Appl. No.: 11/077,922

(22) Filed: Mar. 11, 2005

(65) Prior Publication Data

US 2006/0028934 A1   Feb. 9, 2006

(30) Foreign Application Priority Data

Jul. 16, 2004 (TW) .............................. 93121312 A

(51) Int. Cl.
*G11B 7/00* (2006.01)

(52) U.S. Cl. .............................. 369/112.28; 369/112.21

(58) Field of Classification Search ............ 369/112.28, 369/112.29, 112.01, 112.02, 44.37, 44.23, 369/112.21, 112.14, 112.09

See application file for complete search history.

(56) References Cited

U.S. PATENT DOCUMENTS

| | | | |
|---|---|---|---|
| 5,189,655 A | 2/1993 | Ogata et al. | |
| 6,324,150 B1 | 11/2001 | Ju | |
| 6,442,124 B1 | 8/2002 | Chung et al. | |
| 6,654,336 B2 | 11/2003 | Kadowaki et al. | |
| 6,747,939 B2 | 6/2004 | Saitoh et al. | |
| 6,922,268 B2 * | 7/2005 | Hama et al. | 359/204 |
| 7,006,269 B2 * | 2/2006 | Hama et al. | 359/204 |
| 7,023,787 B2 * | 4/2006 | Katayama | 369/112.28 |
| 2003/0090988 A1 | 5/2003 | Sun et al. | |
| 2003/0185136 A1 | 10/2003 | Kaiho et al. | |
| 2003/0235137 A1 | 12/2003 | Nishioka et al. | |
| 2004/0156302 A1 * | 8/2004 | Nakata et al. | 369/112.17 |
| 2005/0226124 A1 * | 10/2005 | Kimura et al. | 369/112.08 |

* cited by examiner

*Primary Examiner*—Thang V Tran
(74) *Attorney, Agent, or Firm*—Morris Manning Martin LLP; Tim Tingkang Xia, Esq.

(57) ABSTRACT

An optical pickup head (100) for a high density recording and/or reproducing device compatible with three types of optical recording media. The pickup head includes a first light source (11a) emitting first beams with a first wavelength, a second light source (12a) emitting second beams with a second longer wavelength, a third light source (13a) emitting third beams with a third even longer wavelength, a prism unit (3), a collimating lens (4) located beside the prism unit, and an objective lens (7) for receiving the light beams and transmitting them to the recording media respectively. The prism unit includes a first portion facing the first source and receiving the first beams, a second portion facing the second source and receiving the second beams, a third portion facing the third source and receiving the third beams, and first and second aberration-correcting portions for the second and third beams to pass therethrough.

15 Claims, 3 Drawing Sheets

OPTICAL PICKUP HEAD AND INFORMATION RECORDING AND/OR REPRODUCING DEVICE INCORPORATING SAME

FIELD OF THE INVENTION

The present invention generally relates to an optical pickup head and an information recording and reproducing apparatus using the optical pickup head, the device being able to record information and reproduce recorded information from plural types of optical recording media.

PRIOR ART

Optical disks such as CDs (compact disks) and DVDs (digital versatile disks) have been used as information recording media for some time now. Recently, in order to satisfy ongoing requirements for recording and/or reproducing large quantities of information, optical disks with a memory capacity of more than 20 GB have been developed and utilized. The high recording density of such optical disks requires that a focused spot of a laser light generated by an information recording and/or reproducing device should be small and highly accurate. In general, the size of the focused spot (S) is proportional to the wavelength ($\lambda$) of the light, and inversely proportional to the numerical aperture (NA) of a lens that focuses the light, as expressed by formula (1):

$$S \propto \lambda/NA \qquad (1)$$

It can be seen from formula (1) that a short wavelength and a large NA are used to obtain a smaller sized light beam spot. For instance, an optical pickup for accessing the CD uses a light beam with a wavelength of 780 nm and an objective lens with an NA of 0.45, whereas an optical pickup for accessing the DVD uses a light beam with a wavelength of 650 nm and an objective lens with an NA of 0.6. A standard for a next generation of high density optical disks has been proposed. The standard specifies that an objective lens has an NA of 0.85, and that light beams with a wavelength of about 405 nm are used.

However, increasing the NA of an objective lens leads to sharp increases in coma aberration, a phenomenon which occurs when an optical disk is tilted. Coma aberration in turn leads to poor quality light convergence to the focused spot. Coma aberration caused by tilting of the optical disk is proportional to a thickness of an optical transmissive layer which is between a light entering plane and an information recording plane of the optical disk. Accordingly, increases in coma aberration caused by increasing the NA can be controlled by reducing the thickness of the optical transmissive layer. This approach forms the basis of a current proposal to reduce the thickness of the optical transmissive layer of next generation high density optical disks from 1.2 mm to 0.1 mm.

In using next generation of high density optical disks, the first consideration is the compatibility of corresponding equipment with existing disks. Stated differently, a recording and/or reproducing device for next generation of high density optical disks should also be capable of recording and/or reproducing data on DVDs and CDs which are now in widespread use. However, as indicated above, there are many differences between the three types of optical disks. This makes it difficult to ensure compatibility of equipment with all types of optical disks.

In a conventional solution to the above problems, an optical pickup head for a high density recording and/or reproducing device includes three semiconductor lasers, three collimating lens, at least one optical path synthesizing/separating element, and an objective lens. The three semiconductor lasers emit three light beams with different wavelengths. Each collimating lens corresponds to one semiconductor laser, so as to transform the light beams into parallel light beams. The synthesizing/separating element couples the three light beams from three different optical paths into a common optical path. The objective lens focuses the collimated light beams onto the corresponding optical disks.

The major drawback of the optical pickup head is that it requires large distances between the three semiconductor lasers and the corresponding collimating lenses. This makes the overall size of the recording and/or reproducing device unduly large. Furthermore, because there is only the single common objective lens focusing light having the three different wavelengths, the focusing of the light other than one of these wavelengths is subject to chromatic aberration. Moreover, the three types of disks have different thicknesses, including different thicknesses of light transmission layers thereof. Therefore the focusing of the light of all wavelengths is subject to spherical aberration. These problems in turn lead to poor quality light convergence to the focused spot.

SUMMARY OF THE INVENTION

Accordingly, an object of the present invention is to provide an optical pickup head for a high density recording and/or producing device which is compatible with three types of optical disks, in which aberrations are corrected and a size of the optical pickup head is reduced.

Another object of the present invention is to provide an information recording and/or reproducing device using the above-described optical pickup head.

To achieve the first above object, an optical pickup head for a high density recording and/or reproducing device compatible with three types of optical recording media is provided. The pickup head includes a first light source emitting first light beams with a first wavelength, a second light source emitting second light beams with a second wavelength greater than the first wavelength, a third light source emitting third light beams with a third wavelength greater than the second wavelength, a prism unit, a collimating lens located beside the prism unit for collimating incident first, second and third light beams; and an objective lens for receiving the first, second and third light beams, and transmitting the first, second and third light beams to the first, second and third optical recording media respectively. The prism unit includes a first portion facing the first light source adapted to receive the first light beams emitted by the first light source, a second portion facing the second light source adapted to receive the second light beams emitted by the second light source, a third portion facing the third light source adapted to receive the third light beams emitted by the third light source, and a first aberration-correcting portion for the second light beams to pass therethrough, and a second aberration-correcting portion for the third light beams to pass therethrough.

To achieve the second above object, an information recording and/or reproducing device includes an optical pickup head as described in the above paragraph, a drive mechanism for changing a relative position between any one of the first, second and third optical recording media and the optical pickup head, and an electrical signal processor for receiving signals output from the optical pickup head and performing calculations on the signals to obtain desired information.

DETAILED DESCRIPTION OF THE INVENTION

Figure 1:
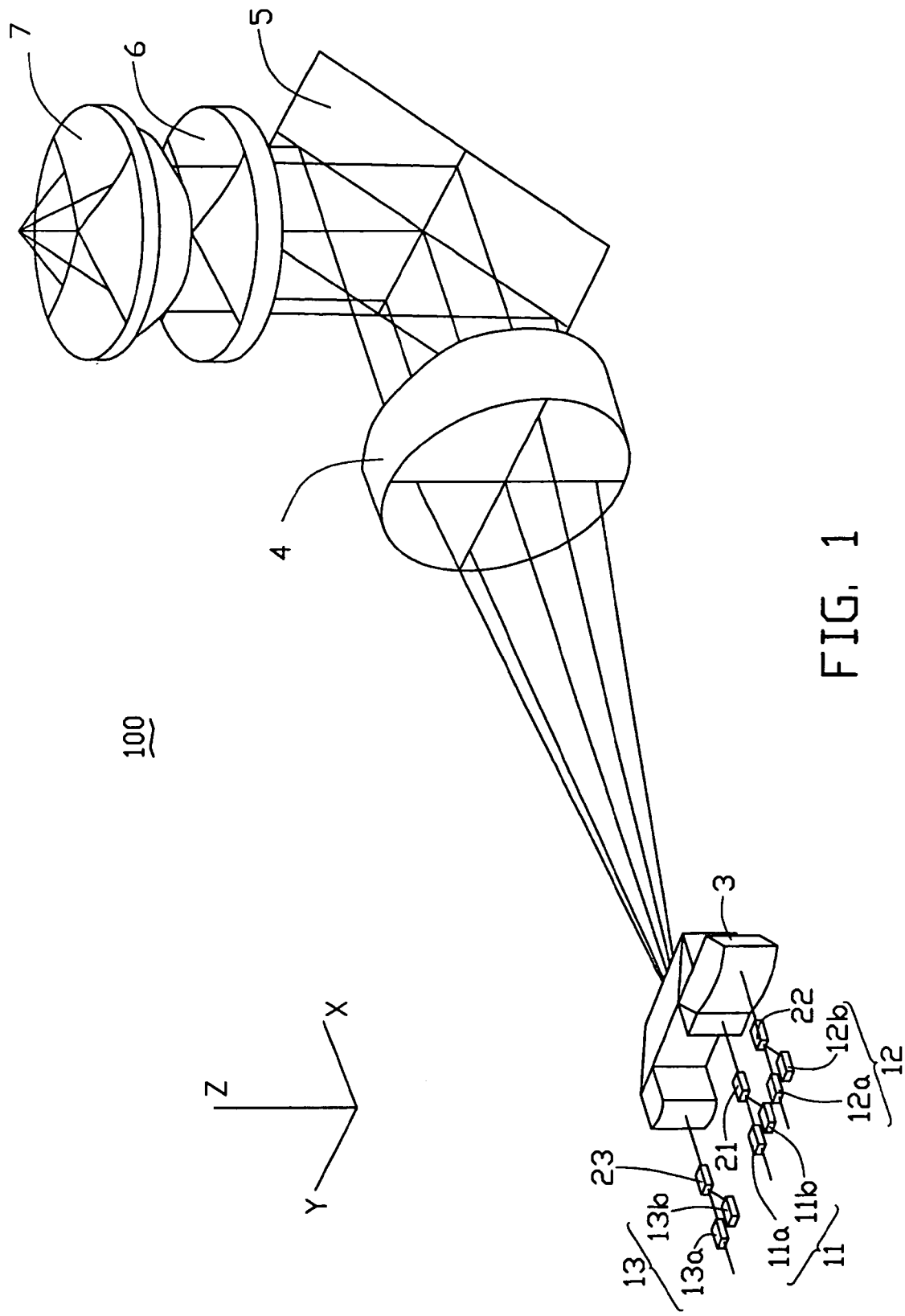
FIG. 1 is an exploded, isometric view of an arrangement of parts of an optical pickup head according to the preferred embodiment of the present invention, also showing essential light paths thereof.

Referring to FIG. 1, an optical pickup head 100 according to the preferred embodiment of the present invention is illustrated. The optical pickup head 100 is used in an information recording and/or reproducing device (not shown) compatible with three types of optical recording media (not shown). Here, the three types of optical recording media respectively are high density optical disks such as BDs (Blu-ray disks) or HD-DVDs (High-Definition Digital Versatile Disks), DVDs, and CDs.

The optical pickup head 100 includes three juxtaposed semiconductor modules: a first semiconductor module 11, a second semiconductor module 12, and a third semiconductor module 13. Each of the semiconductor modules 11, 12 and 13 includes a semiconductor laser 11a, 12a and 13a, and a photo detector 11b, 12b and 13b formed integrally with the corresponding semiconductor laser 11a, 12a and 13a. The three semiconductor lasers 11a, 12a and 13a emit three laser beams with different wavelengths to be employed as irradiation light beams. First light beams from the first semiconductor laser 11a have a shortest wavelength such as about 405 nm; second light beams from the second semiconductor laser 12a have an intermediate wavelength such as 650 nm; and third light beams from the third semiconductor laser 13a have a largest wavelength such as 780 nm.

Figure 2:
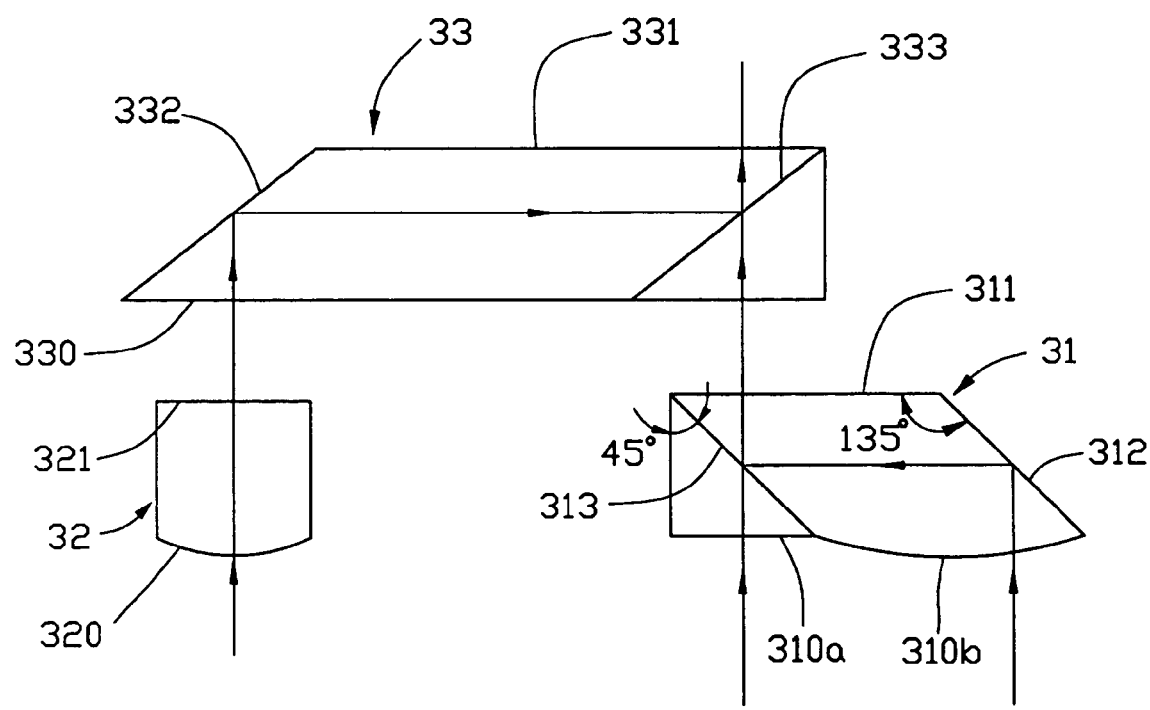
FIG. 2 is an exploded, top plan view of a prism unit of the optical pickup head of FIG. 1, showing essential light paths thereof.

The optical pickup head 100 also includes first, second and third diffraction gratings 21, 22 and 23, a prism unit 3, a collimating lens 4, a mirror 5, a wavelength selector 6 and an objective lens 7. Also referring to FIG. 2, the prism unit 3 comprises three juxtaposed prisms 31, 32 and 33. First and second prisms 31 and 32 are juxtaposed on a same side of a third prism 33. The three diffraction gratings 21, 22 and 23 are respectively located on three optical paths between the three semiconductor modules 11, 12 and 13 and the first and second prism 31 and 32.

The first prism 31 includes a first incident portion 310a, and a second incident portion 310b juxtaposed with the first incident portion 310a. The first incident portion 310a is complanate, and faces the first semiconductor module 11 so as to receive the first light beams emitted from the first semiconductor laser 11a. The second incident portion 310b is spherical or aspherical, and faces the second semiconductor module 12 for converging the second light beams. The first prism 31 also includes a first emergent portion 311 generally parallel to the first and second incident portions 310a, 310b, a first reflective surface 312 interconnecting the second incident portion 310b and the first emergent portion 311 at corresponding ends thereof, and a splitting plane 313 parallel to the first reflective surface 312 at an opposite side of the first prism 31. The first splitting plane 313 allows incident light beams with a certain wavelength to pass therethrough, and reflects incident light beams with other wavelengths.

The second prism 32 is formed with a spherical surface or an aspherical surface, and includes a third incident portion 320 and a third emergent portion 321 opposite to the third incident portion 320. In the illustrated embodiment, an aspherical surface is provided at the third incident portion 320. In alternative embodiments, the aspherical surface can be provided at the third emergent portion 321 or on the third prism 33. Further, a spherical surface can be provided at the third incident portion 310, the third emergent portion 321, or the third prism 33.

The third prism 33 includes a middle incident portion 330, a common emergent portion 331 parallel to the middle incident portion 330, a third reflective surface 332 interconnecting the middle incident portion 330 and the common emergent portion 331 at corresponding ends thereof, and a third splitting plane parallel to the third reflective surface 332 at an opposite side of the third prism 33. Part of the first emergent portion 311 of the first prism 31 and the third emergent portion 321 of the second prism 32 are juxtaposed beside two opposite ends of the middle incident portion 330 respectively. The third splitting plane 333 allows incident light beams with the first and second wavelengths to pass therethrough, and reflects incident light beams with the third wavelength.

The collimating lens 4 is positioned beside the third prism 33, and accords with the wavelength of the first light beams so as to converge the first light beams into parallel light beams. The mirror 5 is aslant so as to reflect light beams from the collimating lens 4 to the wavelength selector 6. The objective lens 7 has a large numerical aperture according with the optical disk which has the highest recording density; that is, the optical disk having the shortest wavelength, 405 nm. The wavelength selector 6 is located beside the objective lens 7, to selectively transmit incident light beams thereto.

Figure 3A:
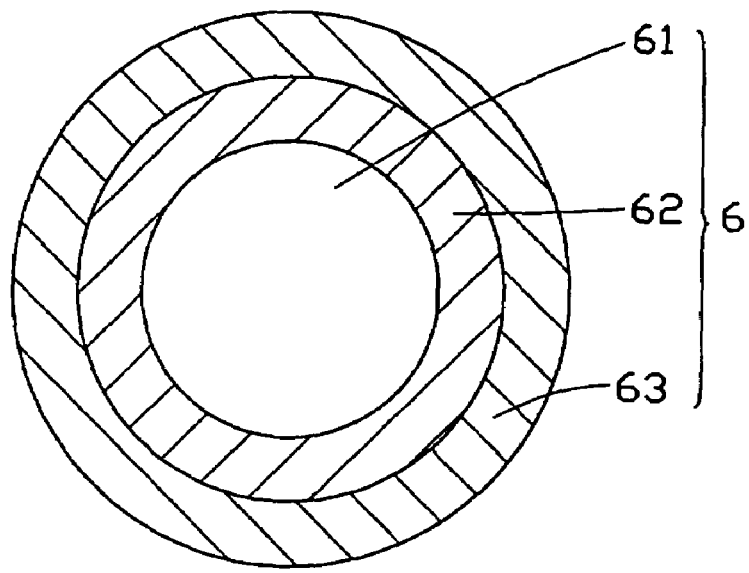
FIG. 3A is a schematic, enlarged transverse cross-sectional view of a wavelength selector of the optical pickup head of FIG. 1.
Figure 3B:
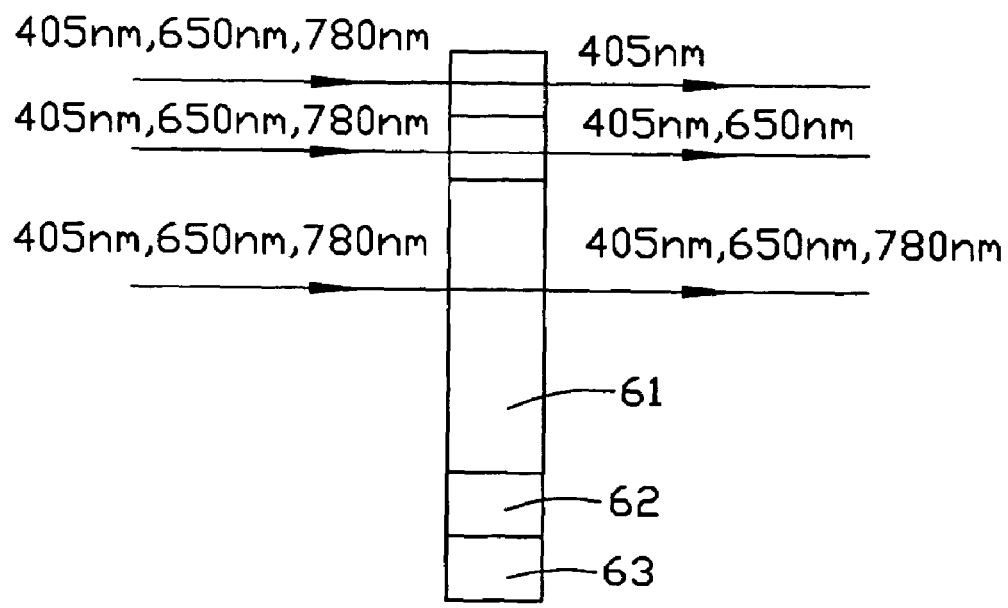
FIG. 3B is a schematic, enlarged axial cross-sectional view of the wavelength selector of the optical pickup head of FIG. 1, showing wavelength-dependent transmission characteristics of various portions of the wavelength selector.

Referring to FIGS. 3A and 3B, the wavelength selector 6 includes a central portion 61, a middle portion 62 encircling the central portion 61, and a peripheral portion 63 encircling the middle portion 63. The three portions 61, 62 and 63 have different transmission functions. With regard to the central portion 61, light beams with any wavelength can pass therethrough. With regard to the middle portion 62, light beams with the first and second wavelengths can pass therethrough, and light beams with the third wavelength are blocked. With regard to the peripheral portion 63, only light beams with first wavelength can pass therethrough, and light beams with the second and third wavelengths are blocked. Therefore, the NA of the objective lens 7 is different when focusing the light beams with different wavelengths.

When recording an information signal on and/or reproducing an information signal from a next generation high density optical disk, the semiconductor laser 11a emits first light beams (not labeled) with the shortest wavelength 405 nm. The first light beams pass through the first diffraction grating 21 along the original direction thereof, and enter the first prism 31 through the first incident portion 310a. In the first prism 31, the first light beams propagate to the first splitting plane 313. The first light beams pass directly through the first splitting plane 313 because of their first wavelength, and transmit out from the first emergent portion 311. After exiting the first prism 31, the first light beams enter the third prism 33 through the middle incident portion 330, and directly propagate to the third splitting plane 333. The first light beams pass directly through the third splitting plane 333 because of their first wavelength. After passing through the third splitting plane 333, the first light beams transmit out from the common emergent portion 331.

After exiting the prism unit 3, the first light beams are condensed by the collimating lens 4 and transformed into a first luminous flux of parallel light beams. The first luminous flux transmits to the mirror 5, which changes the transmitting direction toward the high density optical disk. Accordingly, the first luminous flux illuminates the wavelength selector 6. All three portions 61, 62, 63 of the wavelength selector 6 transmit the first luminous flux, so that the first luminous flux completely passes through the wavelength selector 6 and is incident on the objective lens 7. The objective lens 7 converges the first luminous flux to form a focused light spot on the next generation high density optical disk.

After forming the light spot on the next generation high density optical disk, the next generation high density optical disk reflects the incident beams, so as to form first return beams (not labeled). The first return beams sequentially pass through/from the objective lens 7, the wavelength selector 6, the mirror 5, the collimating lens 4, and the prism unit 3, and reach the first diffraction grating 21. The first diffraction grating 21 diffracts the first return beams toward the photo detector 11b of the first semiconductor module 11. Then the photo detector 11b translates the first return beams into electrical signals, which are output from the optical pickup head 100. An electrical signal processor of the information recording and/or reproducing device receives the electrical signals output from the optical pickup head 100, and performs calculations on the electrical signals to obtain desired information. Furthermore, a drive mechanism of the information recording and/or reproducing device changes a relative position between the next generation high density optical disk and the optical pickup head 100, also based on the electrical signals output from the optical pickup head 100.

When recording an information signal on and/or reproducing an information signal from the DVD, the semiconductor laser 12a emits second light beams (not labeled) with the intermediate wavelength 650 nm. The second light beams propagate through the second diffraction grating 22, and transmit to the second incident portion 310b. The second light beams are converged by the second incident portion 310b, and propagate to the first reflective surface 312. The second light beams are reflected by the first reflective surface 312, and then transmit out from the first emergent portion 311. After exiting the first prism 31, the second light beams enter the third prism 33 through the middle incident portion 330. The second light beams pass directly through the third splitting plane 333 because of their wavelength. Subsequently, the second light beams transmit out from the common emergent portion 331.

After exiting the prism unit 3, the second light beams are condensed by the collimating lens 4, and transformed into a second luminous flux of approximately parallel light beams. The second luminous flux transmits to the mirror 5, which changes the transmitting direction toward the DVD. Accordingly, the second luminous flux illuminates the wavelength selector 6. The central portion 61 and middle portion 62 of the wavelength selector 6 transmit the second luminous flux, and the peripheral portion 63 blocks the second luminous flux. Therefore a part of the second luminous flux is blocked, and the other part of the second luminous flux transmits to the objective lens 7. The objective lens 7 converges the second luminous flux to form a focused light spot on the DVD.

After forming the light spot on the DVD, the DVD reflects the incident beams, so as to form second return beams (not labeled). The second return beams sequentially pass through/from the objective lens 7, the wavelength selector 6, the mirror 5, the collimating lens 4, and the prism unit 3, and reach the second diffraction grating 21. The second diffraction grating 22 diffracts the second return beams toward the photo detector 12b of the second semiconductor module 12. Then, the photo detector 12b translates the second return beams into electrical signals, which are output from the optical pickup head 100. The electrical signal processor of the information recording and/or reproducing device receives electrical signals output from the optical pickup head 100, and performs calculations on the electrical signals to obtain desired information. Furthermore, the drive mechanism of the information recording and/or reproducing device changes a relative position between the DVD and the optical pickup head 100, also based on electrical signals output from the optical pickup head 100.

When recording an information signal on and/or reproducing an information signal from the CD, the semiconductor laser 13a emits third light beams (not labeled) with the long wavelength 780 nm. The third light beams propagate through the third diffraction grating 22, and enter the third prism 32 through the third incident portion 320. The third light beams are converged by the third incident portion 320, and subsequently transmit out from the third emergent portion 321. Then, the third light beams enter the third prism 33 through the middle incident portion 330. In the third prism 33, the third light beams are sequentially reflected by the third reflective surface 332 and the third splitting plane 333, and transmit out from the common emergent portion 331.

After exiting the prism unit 3, the third light beams are condensed by the collimating lens 4 and transformed into a third luminous flux of approximately parallel light beams. The third luminous flux transmits to the mirror 5, which changes the transmitting direction toward the CD. Accordingly, the third luminous flux illuminates the wavelength selector 6. Only the central portion 61 of the wavelength selector 6 transmits the third luminous flux, and the middle and peripheral portions 62, 63 block the second luminous flux. Therefore a small part of the second luminous flux passes through the wavelength selector 6 and transmits to the objective lens 7. The objective lens 7 converges the third luminous flux to form a focused light spot on the CD.

After forming the light spot on the CD, the CD reflects the incident beams, so as to form third return beams (not labeled). The third return beams sequentially pass through/from the objective lens 7, the wavelength selector 6, the mirror 5, the collimating lens 4, and the prism unit 3, and reach the third diffraction grating 23. The third diffraction grating 23 diffracts the third return beams towards the photo detector 13b of the third semiconductor module 13. Then the photo detector 13b translates the third return beams into electrical signals, which are output from the optical pickup head 100. The electrical signal processor of the information recording and/or reproducing device receives electrical signals output from the optical pickup head 100, and performs calculations on the electrical signals to obtain desired information. Furthermore, the drive mechanism of the information recording and/or reproducing device changes a relative position between the CD and the optical pickup head 100, also based on electrical signals output from the optical pickup head 100.

In the above-mentioned optical pickup head 100, both of (i) the working wavelength of optical elements, such as the first semiconductor laser 11a, the collimating lens 4 and the objective lens 7, and (ii) the numerical aperture of the objective lens 7 are matched with requirements of the next generation high density optical disk. Therefore, when recording the information signal on and/or reproducing the information signal from the next generation high density optical disk, the optical pickup head 100 has high quality light convergence to the focused spot. Furthermore, the first prism 31 has a spherical or an aspherical surface. Therefore, aberrations caused by non-matching between the second luminous flux and the collimating lens 5 and objective lens 7 are corrected. Similarly, the second prism 32 has an aspherical surface. Therefore aberrations caused by non-matching between the third luminous flux and the collimating lens 5 and objective lens 7 are corrected. Moreover, the wavelength selector 6 selects part of the luminous fluxes with wavelengths of 650 nm and 780 nm transmitting to the objective lens 7, so that only part of the objective lens 7 can be illuminated. Thus, the NA of the objective lens 7 is reduced when focusing the second or third luminous fluxes, and corresponds to the small NA required by the DVD and CD respectively. Hence, when recording the information signal on and/or reproducing the information signal from the DVD and the CD, the optical pickup head also has high quality light convergence to the focused spot.

Furthermore, because the second and third light beams are reflected by the surfaces of the prism unit 3, the distances between the collimating lens 4 and the second and third semiconductor modules 12 and 13 are reduced. This enables the optical pickup head 100 to be miniaturized. Moreover, the spherical/aspherical surfaces are directly formed on the first and second prisms 31 and 32, so that no extra optical element need be added to the optical pickup head 100. This further facilitates miniaturization of the optical pickup head 100, and improves the efficiency of production.

Although the present invention has been described with reference to specific embodiments, it should be noted that the described embodiments are not necessarily exclusive, and that various changes and modifications may be made to the described embodiments without departing from the scope of the invention as defined by the appended claims.

I claim:

1. An optical pickup head for a high density recording and/or reproducing device compatible with three types of optical recording media, comprising:
    a first light source emitting first light beams with a first wavelength;
    a second light source emitting second light beams with a second wavelength greater than the first wavelength;
    a third light source emitting third light beams with a third wavelength greater than the second wavelength;
    a prism unit including a first portion facing the first light source adapted to receive the first light beams emitted by the first light source, a second portion facing the second light source adapted to receive the second light beams emitted by the second light source, and a third portion facing the third light source adapted to receive the third light beams emitted by the third light source;
    a collimating lens located beside the prism unit for collimating incident first, second and third light beams; and
    an objective lens for receiving the first, second and third light beams, and transmitting the first, second and third light beams to the first, second and third optical recording media respectively;
    wherein, the prism unit further includes a first aberration-correcting portion for the second light beams to pass therethrough, and a second aberration-correcting portion for the third light beams to pass therethrough.

2. The optical pickup head according to claim 1, wherein the prism unit includes a first prism, a second prism and a third prism, and the first prism and second prisms are juxtaposed with the third prism.

3. The optical pickup head according to claim 2, wherein the first prism and the second prism are located on a same side of the third prism.

4. The optical pickup head according to claim 3, wherein the first aberration-correcting portion is provided on the first prism, and the second aberration-correcting portion is provided on the second prism.

5. The optical pickup head according to claim 1, wherein at least one of the first and second aberration-correcting portions is an aspherical surface.

6. The optical pickup head according to claim 1, wherein at least one of the first and second aberration-correcting portions is a spherical surface.

7. The optical pickup head according to claim 1, wherein the collimating lens is disposed in a light path between the objective lens and the three sources to collimate at least one of the first, second and third light beams into parallel light beams.

8. The optical pickup head according to claim 1, wherein the numerical aperture of the objective lens accords with one of the three optical recording media, being that which has the highest recording density.

9. The optical pickup head according to claim 1, wherein the optical pickup head further includes a wavelength selector located between the collimating lens and the objective lens, for selectively passing all or a portion of the first, second and third light beams.

10. The optical pickup head according to claim 9, wherein the wavelength selector does not block any of the first light beams.

11. An information recording and reproducing apparatus compatible with three types of optical recording media, comprising:
    an optical pickup head, comprising:
    a first light source emitting first light beams with a first wavelength;
    a second light source emitting second light beams with a second wavelength greater than the first wavelength;
    a third light source emitting third light beams with a third wavelength greater than the second wavelength;
    a prism unit including a first portion facing the first light source adapted to receive the first light beams emitted by the first light source, a second portion facing the second light source adapted to receive the second light beams emitted by the second light source, and a third portion facing the third light source adapted to receive the third light beams emitted by the third light source;
    a collimating lens located beside the prism unit for collimating incident first, second and third light beams; and
    an objective lens for receiving the first, second and third light beams, and transmitting the first, second and third light beams to the first, second and third optical recording media respectively;
    wherein, the prism unit further includes a first aberration-correcting portion for the second light beams to pass therethrough, and a second aberration-correcting portion for the third light beams to pass therethrough.

12. An information recording and reproducing apparatus compatible with at least three types of optical recording media, comprising:
    an optical pickup head for optically obtaining information from a selective one of said at least three types of optical recording media, comprising a first light source emitting first light beams with a first wavelength, a second light source emitting second light beams with a second wavelength greater than said first wavelength, and a third light source emitting third light beams with a third wavelength greater than said second wavelength, respectively corresponding to each of said at least three types of optical recording media, a prism unit including a first portion facing said first light source adapted to receive the first light beams emitted by said first light source, a second portion facing said second light source adapted to receive said second light beams emitted by said second light source, and a third portion facing said third light source adapted to receive said third light beams emitted by said third light source, and an objective lens disposed next to said selective one of said at least three types of optical recording media for selectively receiving a corresponding one of said first, second and third light beams from said prism unit and further transmitting said corresponding one of said first, second and third light beams to said selective one of said at least three types of optical recording media, said prism unit comprising a first aberration-correcting portion for passage of said second light beams and a second aberration-correcting portion for passage said third light beams before said second and third light beams leave said prism unit.

13. The information recording and reproducing apparatus according to claim 12, wherein said prism unit includes a first prism as said first and second portions of said prism unit, a second prism as said third portion of said prism unit and a third prism, and said first prism and second prisms are juxtaposed with said third prism.

14. The information recording and reproducing apparatus according to claim 13, wherein said first prism and said second prism are located at a common side of said third prism.

15. The information recording and reproducing apparatus according to claim 13, wherein said first aberration-correcting portion is provided on said first prism, and said second aberration-correcting portion is provided on said second prism.

* * * * *